United States Patent [19]
Green et al.

[11] 3,758,723
[45] Sept. 11, 1973

[54] X-RAY INSPECTION SYSTEM

[75] Inventors: Donald T. Green, Shaker Heights; James L. Snarr, Cleveland Heights, both of Ohio

[73] Assignee: Imagex, Inc., Mantor, Ohio

[22] Filed: Jan. 18, 1972

[21] Appl. No.: 218,724

[52] U.S. Cl............... 178/6.8, 73/146, 178/DIG. 5, 250/52
[51] Int. Cl..... G01n 23/18, H01j 37/20, H04n 7/18
[58] Field of Search.................. 178/DIG. 5, 7.5 SE, 178/6.8; 250/52, 53, 83.3 D, 92, 91; 73/146

[56] References Cited
UNITED STATES PATENTS

| | | |
|---|---|---|
| 3,280,253 | 10/1966 | McMaster...................... 178/DIG. 5 |
| 3,497,614 | 2/1970 | Petrocelli...................... 178/7.5 SE |
| 3,679,823 | 7/1972 | Corrigan....................... 178/DIG. 5 |

*Primary Examiner*—Howard W. Britton
*Attorney*—Harold S. Meyer

[57] ABSTRACT

An X-ray inspection system includes placement of an article to be inspected in a stationary position between an X-ray source and a fluorescent screen, focusing the X-ray shadow picture produced on the fluorescent screen on the target of a television camera tube capable of integrating, preferably through a light intensifier, for a sufficient time to produce an intense electrostatic image, transferring the image to a storage device by snatching a single frame, and displaying the image in the storage device continuously on the picture tube of a monitor while moving the article for inspection of a different area and while producing a new electrostatic image on the target of the camera tube.

10 Claims, 1 Drawing Figure

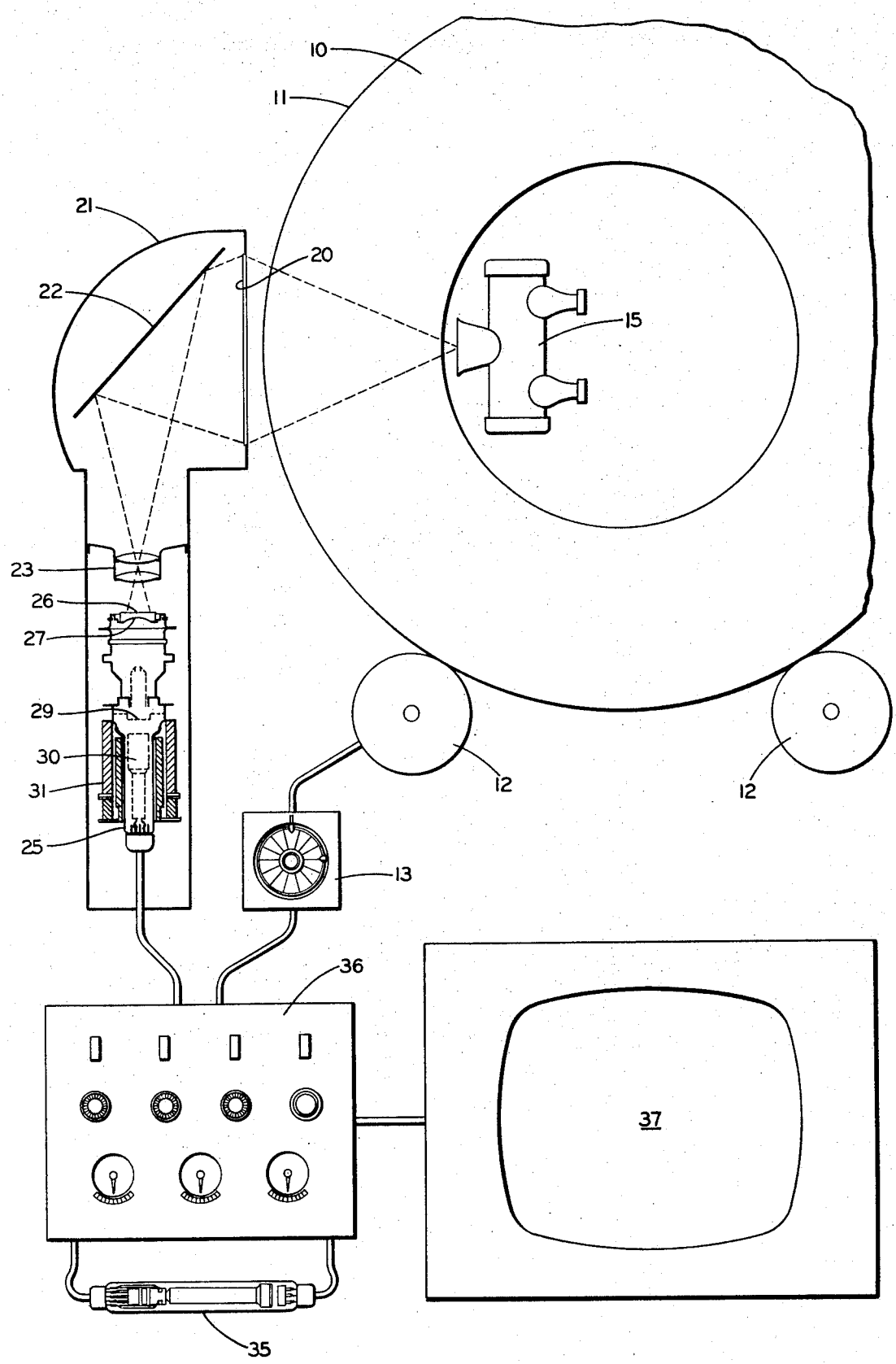

X-RAY INSPECTION SYSTEM

BACKGROUND OF THE INVENTION

Many manufactured articles contain internal components which need to be precisely located for proper performance, but which may be misplaced initially or displaced during subsequent manufacturing steps, and which are hidden from view so that visual inspection of the finished article will not detect improper location. Attempts to use X-ray (Roentgen ray) examination have been only partially successful, particularly in inspecting articles having components differing only slightly in density, such as pneumatic tires made of rubber reinforced with textile material, since low contrast and poor resolution make the procedure very slow and expensive, and also not very reliable.

Attempts to overcome this difficulty by increasing the intensity of X-rays, by using a higher voltage, have not succeeded because in general the contrast of the X-ray pictures is reduced as the voltage on the X-ray tube is increased.

SUMMARY OF THE INVENTION

We have discovered that rapid and reliable X-ray inspection can be provided, even of articles with a slight difference in density of components, by using a particular combination of devices.

In our invention we place the article to be inspected in a stationary position between an X-ray tube and a fluoroscopic screen, using a low voltage on the order of 15 Kilovolts, so as to produce a shadow picture of maximum contrast but low brightness. The fluoroscopic picture is focused on the input of an integrating television camera tube by a large aperture optical system so as to utilize as much as is conveniently possible of the dim fluorescent light. The light may be intensified by placing an electronic light intensifier between the lens and the camera tube if desired. Preferably, the light intensifier should be fiber-optic coupled to the camera tube.

We prefer to use an orthicon camera tube in which the image of the fluorescent picture is received on a photocathode, producing electron streams which are focused on a target of a type which permits integration of the electric charge formed on each element of area of the target as the result of continuing exposure to the weak energy received in the beam focused on the target. In this invention the article is held in a stationary position until the cumulative charge on the target results in an image intensity suitable for visual examination. The electrostatic image on the target is then transferred by "snatching" a frame to a storage device by segmental scanning of the image by the electron beam for one frame only and transmitting the resulting video signal to the storage device where a persistent record of the electrostatic image is formed.

The choice of camera tube and associated circuitry is very important, since the operation of the tube in the integrating mode demands different performance than in the usual 30 frames per second (60 fields, interlaced) mode. The noise level of the tube must be very low compared to its signal strength, since the noise will be integrated as well as the signal. Further, the noise level of the associated circuitry, particularly the first stages of video amplification, must be very low, since this noise is "frozen" when a single frame is "snatched," and appears in a state of suspended animation in the subsequent image.

When viewing in the "live" or normal television mode, this noise tends to average out in the eye of the viewer, and may not be objectionable, but when "frozen" by snatching a single television frame, it may seriously degrade the resolution of the resultant stored image.

Further, the way in which the light input to the camera tube varies is very important. Since it is difficult in the inspection of industrial articles with X-ray to prevent large point-to-point variations in the X-ray input to the fluorescent screen, the camera tube ideally must be able to accommodate itself to large variations in signal input to different parts of the target, without damage to the target or degradation of the image quality in adjacent areas.

Suitable integrating camera tubes and low noise circuitry are well known and available from a number of sources. For example, orthicon camera tubes can be obtained which are very tolerant of large differences in light input from one area of the target to another.

The storage device may be any of the known types which is capable of delivering a reading on a television monitor over a convenient period of time, such as magnetic tape or disc, or an electronic storage tube. Storage tubes are available with silicon targets which will retain the image with less than 50 percent reduction in brightness of the visual reproduction on the monitor for more than 10 minutes.

The image received by the storage device is then displayed continuously on the picture tube of a television monitor while the article being inspected is replaced by another article or is shifted to another inspection position and while an image of the next X-ray shadow picture is being built up in the camera tube.

The foregoing sequence of operations is then repeated. Accordingly, the monitor can show a rapid sequence of still X-ray pictures of articles or portions of an article, each picture displayed for a time corresponding to the total time cycle for exposure of the article and replacement by another article or portion of an article.

It should be carefully noted that in ordinary television viewing of an object to be inspected, the object is moved slowly through the X-ray beam, and the operator watches the moving image on the television monitor. In the inspection of tires, for example, this has been the customary method. It must be recognized that there are inherent limitations to the viewing speed in this technique. If a small detail in the object, such as a cord in a tire, moves its own width between two successive scans of the target of the camera tube by the electron beam, the signal read out by the scanning beam will be the average of that produced by the changing position of the detail being examined, and thus the resolution or sharpness of the image produced will be severely impaired.

Cords in tires are commonly spaced as closely as 30 ends per inch, or approximately on one-thirtieth inch centers. If such a tire moves through the X-ray field at a rate of one-thirtieth inch in one-thirtieth second (the time interval for one television frame) the image of the cord will be badly blurred, and this speed represents, therefore, an upper limit. This in turn means that lineal speeds of 60 inches per minute or higher are unsatisfactory. A small tire such as a 7×14 passenger car tire has a circumference on the tread of approximately 90 inches, so it could not be rotated as rapidly as one revolution in 1 ½ minutes for good inspection.

In practice, such inspection of passenger car tires has been performed in the past in 2 minutes. Using the method of this invention, a 6 inch length of the tire can be inspected in each second, or 15 seconds only are required to view the circumference of the tire used as an example above. Since the image is produced while the tire is stationary, and viewed similarly, the operator is looking at a much sharper image than by customary means, and since the image is stationary, it is easier to interpret. Thus the concept of this invention overcomes a basic limitation of television viewing of X-ray fluorescent images in that it allows more rapid inspection, yet still produces sharper, stationary images.

Instead of being of the limited brightness of the original fluoroscopic picture, or of a conventional television camera reproduction in which the exposure is limited to one-thirtieth of a second or less, the brightness will be many times as great. The increase in brightness is limited only by the time for which it is desired to have an operator view each picture, and how much time it takes to replace the article. Thus, if an operator is to be given a 1-second view, and if a half second is required to move the article, an exposure time of one-half second could be provided, as compared to one-thirtieth second or less using conventional remote viewing of the X-ray picture. If desired, the brightness can be still further increased by use of one or more additional light intensifiers at an appropriate position in the sequence of parts of the system.

DRAWING

The accompanying drawing is a diagrammatic representation of one embodiment of the invention, in which the tread portion of a tire carcass is being inspected by stepwise exposure and a corresponding succession of still pictures on a television monitor.

DETAILED DESCRIPTION

In the drawing, a pneumatic tire 10 is movably supported for examination of its tread portion 11. The supports in this instance include rollers 12 which may be manually turned but are preferably turned intermittently by a suitable power source, not shown. The rollers 12 are connected to a timing device 13 which may be used to control rotation of the supporting rollers 12 and which transmits signals indicating the stationary or moving condition of the rollers 12 and therefore of the tire tread portion 11 being examined.

On one side of the tire tread 11 is a conventional X-ray tube 15 activated by about 15 Kilovolts to produce a maximum contrast fluoroscopic image, and on the other side is a fluorescent screen 20 enclosed in a light-tight camera housing 21.

The camera housing 21 preferably includes a 45° mirror 22 to reflect the shadow picture on the fluorescent screen 20 to one side so as to permit the placement of the optical lens 23 and the remainder of the system out of the X-ray beam. The optical lens 23 is a large aperture lens to produce an optical image of maximum brightness on the screen or receiving surface of the camera tube 25.

The camera tube 25 in this embodiment contains a light intensifier permanently coupled to an integrating target scanned by an electron beam. The light intensifier includes a fiber optic screen 26 for reception of the optical image of the shadow picture at the focal plane of the optical lens 23. The electrons from the photocathode 27 are focused by an electromagnetic lens to produce an electron image on the target 29. This much of the tube is simply a light intensifier which produces an electron image on the target many times as intense as would be possible by direct illumination of a target by an optical image.

The target 29 is made of one of the known materials capable of integrating the energy received on each elementary part of the target surface so as to build up an electrostatic image of maximum intensity over a period of time. The usual internal grids 30 and external coils 31 for scanning the target with a focused electron beam for reading out the image are included.

A storage tube 35 is connected to the camera tube 25 through appropriate circuitry in a control unit 36. The storage tube 35 in this embodiment is a tube similar to a vidicon with a silicon storage target which is addressed by a focused electron beam. The storage tube 35 is also connected to the picture tube of a television monitor 37.

The control unit 36 together with the timer 13 interconnect the several elements to perform the following functions in sequence after placement of an article to be examined in a stationary position between the operating X-ray tube 15 and the fluorescent screen 20:

1. The scanning electron beam of the camera 30 erases the target 29 and is blanked to permit integration of charge on the target.
2. An electron image of the fluorescent shadow picture builds up on the camera tube target 29, with the intensity of the image increasing continuously with time of exposure.
3. After a predetermined time of exposure, the timer 13 connects the camera 25 temporarily to the storage tube 35 and unblanks the scanning beam to cause it to scan the target 29 for one television frame and transfer the electron image as a single frame to the target of the storage tube 35.
4. The storage tube 35 is connected to the monitor 37 and the electron image on the target of the storage tube is continuously displayed on the tube of the monitor, commencing after transfer of the image to the storage tube and ending when the camera 25 is temporarily connected to the storage tube 35 in step 3 of the next succeeding cycle.
5. While the picture is being displayed on the monitor 37, the supporting rollers 12 are actuated to move the next portion of the article into position for inspection.
6. After motion of the article has ceased, the cycle is restarted with step No. 1.

These simple functions can each be performed in various ways using conventional means well known to the art. Thus, in the foregoing example an orthicon tube coupled to a light intensifier is shown. In some situations a simple integrating vidicon without light intensifier may be used, with enhancement of brightness primarily by integration of the charge on the target, which may be over a longer time interval if that is convenient. On the other hand, an additional light intensifier may be interposed if desired between the optical system and the integrating vidicon or other camera tube. The timer may be a mechanical clock device, or may be a pulse counter actuated by the alternating power supply, or any other device capable of repetitively signaling small time intervals in a predetermined order.

The storage device, as indicated previously, need not be a storage tube in which the picture is stored as an electrostatic image on a target, but such a storage tube is particularly compact and modest in cost, requiring a minimum of auxiliary control and operating elements.

When the system of this invention is used in inspecting pneumatic tires for hidden defects, it is found that the entire tread and shoulder area can be examined using a fluorescent screen of convenient size in a single sequence of 15 to 60 cycles of about one second each, depending on size of the tire, with the actual exposure in each cycle being at least a half second. Depending on the scanning pattern and other variables, this represents a large multiple of exposure time, from about 15 to 50 times the exposure previously used in X-ray examination with television monitoring. Consequently, the brightness of this one picture per second is incomparably greater than in previous modes of operation presenting from 30 to 60 or more frames per second. Moreover, a great increase in resolution and sharpness of definition is observed, since previous examination of surfaces in motion has resulted in a great loss in resolution because of persistence of the previous image, or in uneconomical slowing down of operation to minimize the loss of sharpness. The combination of these effects results in a greatly superior inspection in a fraction of the time previously required.

If it is desired, simple controls can be added for magnifying the image in a well known way, by causing the scanning beam to sweep over a smaller area of the target and thus increase the ratio of size of the picture displayed on the monitor to the size of the area of target involved. If this magnification is undertaken in the storage tube, it results in a "zoom" effect increasing size without increasing resolution. If magnification is undertaken in the camera tube, it can result in production of a satisfactorily large picture of a small article with a corresponding increase in resolution. On the other hand, if a large article is being examined, and if the initial picture is unclear, the article can be replaced for reinspection at a greater magnification to determine definitely whether a defect is present or not.

We claim:

1. A process for X-ray inspection of articles, which process comprises interposing a stationary article between an X-ray source and a fluorescent screen, forming an optical image of the fluorescent shadow picture on the screen of an integrating camera tube to induce an electrostatic image on its target, integrating the image on the target for a period at least several times as long as a video scan period, snatch-scanning the target of the camera tube and transferring the integrated image to a storage device, displaying the image which is in the storage device as a visual image on the picture surface of a television monitor, and moving the article during display of the image of the article in its previous position.

2. A process as in claim 1, in which the target of the camera tube is erased after placement of the article to prepare the camera tube for reception of an image of the article, and the article is moved after transfer of its image to the storage device.

3. A process as in claim 2, in which the visual image is displayed on the monitor continuously until transfer of the next succeeding image to the storage device.

4. A process as in claim 3, in which the transfer of the image from the camera tube to the storage device is at a predetermined time after commencement of build-up of the image on the target of the camera tube.

5. A process as in claim 4, in which the area of target scanned is varied to produce varying magnification of the ultimate visual image.

6. A system for X-ray inspection of articles, comprising an X-ray source spaced from a fluorescent screen, means for positioning an article in a temporarily stationary position between the X-ray source and the fluorescent screen, an integrating camera tube, an optical system for producing an optical image of the shadow picture of the fluorescent screen on the screen of the camera tube, an image storage device, means for snatch-scanning the electrostatic image on the target of the camera tube and transferring it to the storage device, timing means for initiating the transfer of the image after integration on the target for a period at least several times as long as a video scan period, and means for continuously displaying a visible reproduction of the image which is in the storage device.

7. A system as in claim 6, including means for erasing the target of the camera tube to prepare it for reception of a new image.

8. A system as in claim 7, including timing means for activating the positioning means to move the article after transfer of the image to the storage device.

9. A system as in claim 8, in which the storage device is an electrical storage tube.

10. A system as in claim 9, including means for varying the area of target scanned.

* * * * *